United States Patent
Yamamoto (10) Patent No.: US 11,334,030 B2
(45) Date of Patent: May 17, 2022

(54) TIMEPIECE AND TIMEPIECE CONTROL METHOD

(71) Applicant: Seiko Instruments Inc., Chiba (JP)

(72) Inventor: Kosuke Yamamoto, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 127 days.

(21) Appl. No.: 16/737,391

(22) Filed: Jan. 8, 2020

(65) Prior Publication Data
US 2020/0225621 A1 Jul. 16, 2020

(30) Foreign Application Priority Data

Jan. 11, 2019 (JP) .............................. JP2019-003261
Sep. 24, 2019 (JP) .............................. JP2019-172866

(51) Int. Cl.
*G04C 3/14* (2006.01)
*H02P 8/34* (2006.01)
*H02P 8/02* (2006.01)

(52) U.S. Cl.
CPC ................ *G04C 3/143* (2013.01); *H02P 8/02* (2013.01); *H02P 8/34* (2013.01)

(58) Field of Classification Search
CPC ...... H02P 8/00; H02P 8/02; H02P 8/12; H02P 8/38; H02P 8/34; H02P 8/24; G04C 3/143; G04C 3/146; G04C 21/38; G04C 3/14
See application file for complete search history.

(56) References Cited

U.S. PATENT DOCUMENTS

| 5,889,734 A * | 3/1999 | Sato ........................ G04C 3/14 368/64 |
| 7,977,909 B2 * | 7/2011 | Kasuo ...................... H02P 8/02 318/696 |
| 2008/0089183 A1 * | 4/2008 | Manaka .................... H02P 8/02 368/202 |
| 2012/0207619 A1 * | 8/2012 | Sano ..................... F04D 27/004 417/44.1 |
| 2016/0216695 A1 * | 7/2016 | Takyo .................... G04C 3/143 |
| 2017/0038736 A1 * | 2/2017 | Kawaguchi ............ G04C 3/143 |

FOREIGN PATENT DOCUMENTS

JP 2017-146144 A 8/2017

* cited by examiner

*Primary Examiner* — Bickey Dhakal
(74) *Attorney, Agent, or Firm* — Crowell & Moring LLP (57) ABSTRACT

A timepiece includes a determination unit configured to execute determination processing of determining whether a braking force that brakes a rotor is preferably large or small, the rotor being rotated in a normal rotation direction to rotate a pointer clockwise; and a detection control unit configured to cause execution of rotation detection processing of detecting rotation of the rotor based on a first induced voltage output to a predetermined terminal among the first terminal and the second terminal being connected to a coil configured to generate a magnetic flux to rotate the rotor in the normal rotation direction, the predetermined terminal being selected based on the determination by the determination unit.

11 Claims, 6 Drawing Sheets

TIMEPIECE AND TIMEPIECE CONTROL METHOD

RELATED APPLICATIONS

This application claims priority to Japanese Patent Application Nos. 2019-003261 filed on Jan. 11, 2019, and 2019-172866 filed on Sep. 24, 2019, the entire contents of which are incorporated herein by reference.

BACKGROUND OF THE INVENTION

1. Field of the Invention

An embodiment of the present invention relates to a timepiece and a timepiece control method.

2. Description of the Related Art

At present, a timepiece in which a pointer is rotated by using a stepping motor driven by a battery is widely available. In such a timepiece, when a voltage of the battery is high, a drive pulse having a narrow pulse width may be output to a coil, and when the voltage of the battery is low, a drive pulse having a wide pulse width may be output to the coil.

For example, JP-A-2017-146144 disclosures an electronic timepiece including a pulse width setting unit and a number-of-times setting unit. When the number of consecutive times that it is determined that a rotor of a stepping motor is rotated by a drive pulse having the same pulse width reaches a set number of times, the pulse width setting unit sets a pulse width narrower than a set pulse width of a drive pulse. When it is determined that the rotor is not rotated, the pulse width setting unit sets the pulse width wider than the set pulse width of the drive pulse. Further, when an electric power supply voltage changes and a range of the electric power supply voltage changes among ranges of a plurality of electric power supply voltages, the pulse width setting unit sets the pulse width corresponding to the range of the electric power supply voltage. When the electric power supply voltage decreases and the range of the electric power supply voltage changes, the number-of-times setting unit sets a set number of times to a first set number of times less than a second set number of times. In the electronic timepiece, when the electric power supply voltage decreases, the stepping motor is not rotated and an auxiliary pulse can be prevented from being supplied.

In a timepiece including a stepping motor, detection processing of a rotation state of a rotor is executed. However, the detection processing affects magnitude of a braking force that brakes the rotor. For this reason, the electronic timepiece disclosed in JP-A-2017-146144 may not sufficiently prevent the decrease in the electric power supply voltage when the braking force applied to the rotor is large. The braking force applied to the rotor is, for example, preferably small when a temperature around the timepiece is low and preferably large when an external magnetic field is strong. Therefore, a technology of adjusting the magnitude of the braking force applied to the rotor is desired.

SUMMARY OF THE INVENTION

An embodiment of the invention has been made in view of the above problems, and an object thereof is to provide a timepiece and a timepiece control method in which magnitude of a braking force that brakes a rotor can be adjusted.

In order to achieve the above object, a timepiece according to an aspect of the invention includes a determination unit configured to execute determination processing of determining whether a braking force that brakes a rotor is preferably large or small, the rotor being rotated in a normal rotation direction to rotate a pointer clockwise; and a detection control unit configured to cause, when it is determined that the braking force is preferably large, execution of first rotation detection processing of detecting rotation of the rotor based on a first induced voltage output to a second terminal between a first terminal and the second terminal, the first terminal and the second terminal being connected to a coil configured to generate a magnetic flux to rotate the rotor in the normal rotation direction, and cause, when it is determined that the braking force is preferably small, execution of second rotation detection processing of detecting the rotation of the rotor based on the first induced voltage output to the first terminal and the first induced voltage output to the second terminal.

In the timepiece according to an aspect of the invention, the determination unit is configured to determine that the braking force is preferably small when a voltage of a battery that supplies electric power necessary for causing a drive current to flow to the coil is lower than a voltage threshold, and determine that the braking force is preferably large when the voltage of the battery is equal to or higher than the voltage threshold.

In the timepiece according to an aspect of the invention, the determination unit is configured to determine that the braking force is preferably large when an absolute value of intensity of an external magnetic field applied to the rotor is equal to or larger than a magnetic field threshold.

In the timepiece according to an aspect of the invention, the determination unit is configured to determine that the braking force is preferably small when a temperature calculated based on a resistance value of the coil is lower than a temperature threshold.

In the timepiece according to an aspect of the invention, the determination unit is configured to determine that the braking force is preferably large when the first induced voltage or a second induced voltage is output within a predetermined time since a time point when output of a main drive pulse for causing the drive current to flow to the coil is ended, the second induced voltage causing the drive current to flow in a direction opposite to a direction where the first induced voltage causes the drive current to flow, and determine that the braking force is preferably small when the first induced voltage or the second induced voltage is output after the predetermined time.

In the timepiece according to an aspect of the invention, the determination unit is configured to determine that the braking force is preferably small when a correction drive pulse is output which has electric power consumption larger than that of the main drive pulse for causing the drive current to flow to the coil.

In the timepiece according to an aspect of the invention, the determination unit is configured to re-execute the determination processing when a correction drive pulse is output which has electric power consumption larger than that of the main drive pulse for causing the drive current to flow to the coil, and the detection control unit is configured to cause execution of the first rotation detection processing when it is determined that the braking force is preferably large in the re-executed determination processing, and cause execution of the second rotation detection processing when it is determined that the braking force is preferably small in the re-executed determination processing.

In the timepiece according to an aspect of the invention, the determination unit is configured to execute the determination processing a plurality of times, compare the number of times when it is determined that the braking force is preferably large with the number of times that it is determined that the braking force is preferably small, and determine that the braking force is preferably large when there are more times that it is determined that the braking force is preferably large.

In the timepiece according to an aspect of the invention, the determination unit is configured to execute the determination processing a plurality of times, compare the number of times that it is determined that the braking force is preferably large with the number of times that it is determined that the braking force is preferably small, and determine that the braking force is preferably small when there are more times that it is determined that the braking force is preferably small.

The timepiece according to an aspect of the invention further includes a rotation detection unit configured to specify a reference position where a load applied to the rotor when the pointer is rotated clockwise is compared with and differs from loads from other positions by a predetermined threshold or more based on an induced voltage induced in the coil after the main drive pulse for causing the drive current to flow to the coil is output, in which the determination unit is configured to determine that the braking force is preferably small when the rotation detection unit is not able to specify the reference position.

In order to achieve the above object, a timepiece according to an aspect of the invention includes a motor that includes a rotor configured to rotate a pointer; a determination unit configured to determine magnitude required for a braking force that brakes the rotor; a detection control unit configured to select, based on a determination result of the determination unit, first rotation detection processing of detecting rotation of the rotor or second rotation detection processing which is different from the first rotation detection processing in the braking force; and a rotation detection unit configured to detect the rotation of the rotor in the rotation detection processing selected by the detection control unit.

In order to achieve the above object, a timepiece control method according to an aspect of the invention includes executing determination processing of determining whether a braking force that brakes a rotor is preferably large or small, the rotor being rotated in a normal rotation direction to rotate a pointer clockwise; executing, when it is determined that the braking force is preferably large, first rotation detection processing of detecting rotation of the rotor based on a first induced voltage output to a second terminal between a first terminal and the second terminal, the first terminal and the second terminal being connected to a coil configured to generate a magnetic flux to rotate the rotor in the normal rotation; and executing, when it is determined that the braking force is preferably small, second rotation detection processing of detecting the rotation of the rotor based on the first induced voltage output to the first terminal and the first induced voltage output to the second terminal.

DETAILED DESCRIPTION OF THE PREFERRED EMBODIMENTS

Figure 1:
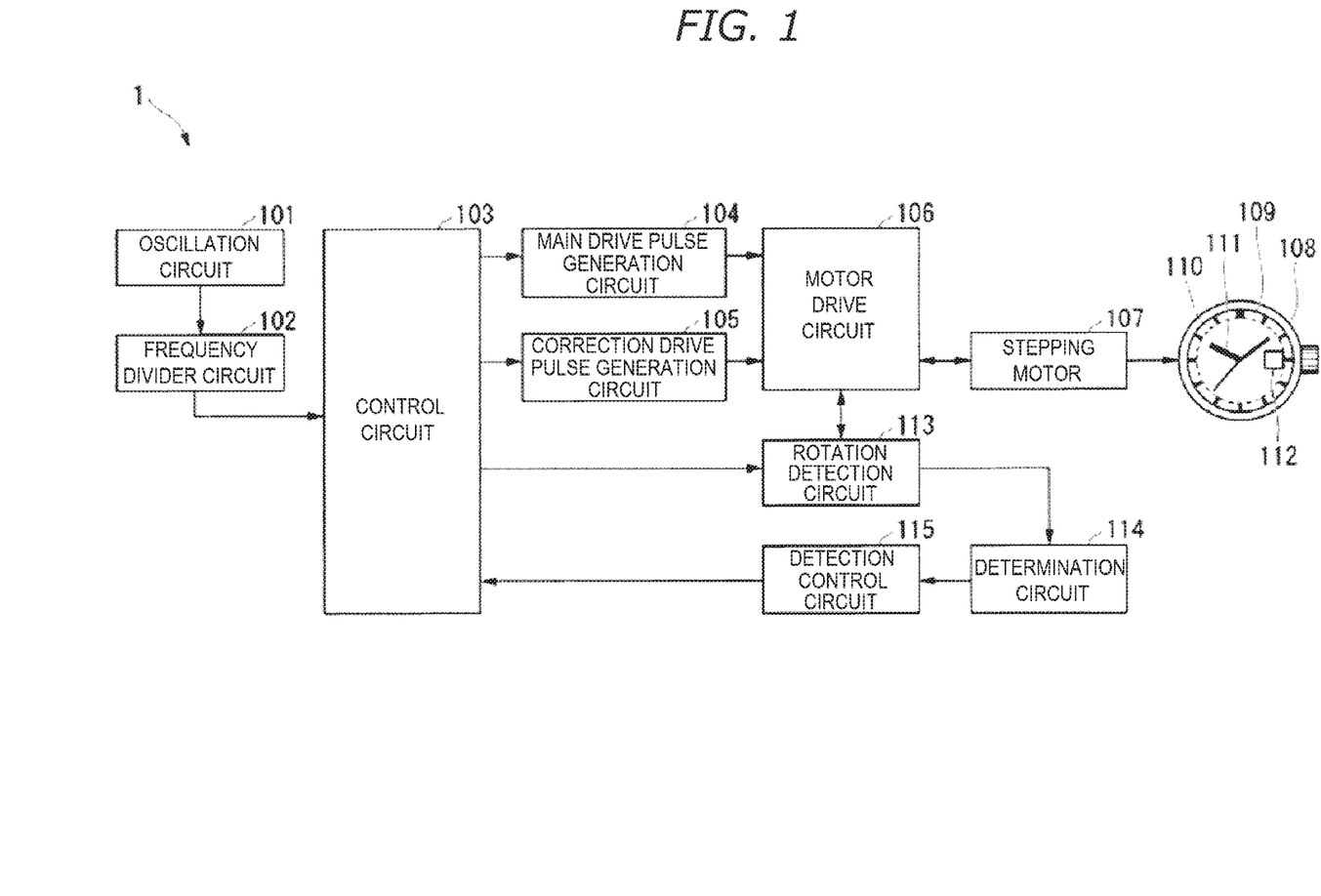
FIG. 1 is a diagram showing an example of a configuration of a timepiece according to an embodiment.

An example of a timepiece and a timepiece control method according to an embodiment will be described with reference to FIGS. 1 to 5A and 5B. FIG. 1 is a diagram showing an example of a configuration of the timepiece according to the embodiment. As shown in FIG. 1, a timepiece 1 includes an oscillation circuit 101, a frequency divider circuit 102, a control circuit 103, a main drive pulse generation circuit 104, a correction drive pulse generation circuit 105, a motor drive circuit 106, a stepping motor 107, a timepiece case 108, an analog display unit 109, a movement 110, a pointer 111, a calendar display unit 112, a rotation detection circuit 113, a determination circuit 114, and a detection control circuit 115.

The oscillation circuit 101 generates a signal having a predetermined frequency and transmits the signal to the frequency divider circuit 102. The frequency divider circuit 102 divides the signal received from the oscillation circuit 101, generates a timepiece signal serving as a reference of the timepiece, and transmits the timepiece signal to the control circuit 103. The control circuit 103 transmits a control signal to each unit of the timepiece 1 based on the timepiece signal or the like received from the frequency divider circuit 102, and controls operations of these units.

The main drive pulse generation circuit 104 generates, based on the control signal received from the control circuit 103, a main drive pulse that drives the stepping motor 107, and outputs the generated main drive pulse to the motor drive circuit 106. The main drive pulse is a comb-shaped voltage pulse output to rotate a rotor 202 of the stepping motor 107 to be described below by one step, that is, 180 degrees in a normal rotation direction, and is output to cause a drive current to flow to a coil 209 to be described below. The normal rotation direction here is a direction where the rotor 202 to be described below is rotated so as to rotate the pointer 111 clockwise. On the other hand, a reverse rotation direction is a direction opposite to the normal rotation direction.

The correction drive pulse generation circuit 105 generates, based on the control signal received from the control circuit 103, a correction drive pulse that drives the stepping motor 107, and outputs the generated correction drive pulse to the motor drive circuit 106. The correction drive pulse is a voltage pulse output when the rotor 202 of the stepping motor 107 to be described below is not rotated in the normal rotation direction by the main drive pulse. Since having a pulse length or a duty ratio larger than that of the main drive pulse, the correction drive pulse has electric power consumption larger than that of the main drive pulse. When the correction drive pulse is output, the correction drive pulse generation circuit 105 outputs, to the determination circuit 114, data indicating that the correction drive pulse was output.

Figure 2:
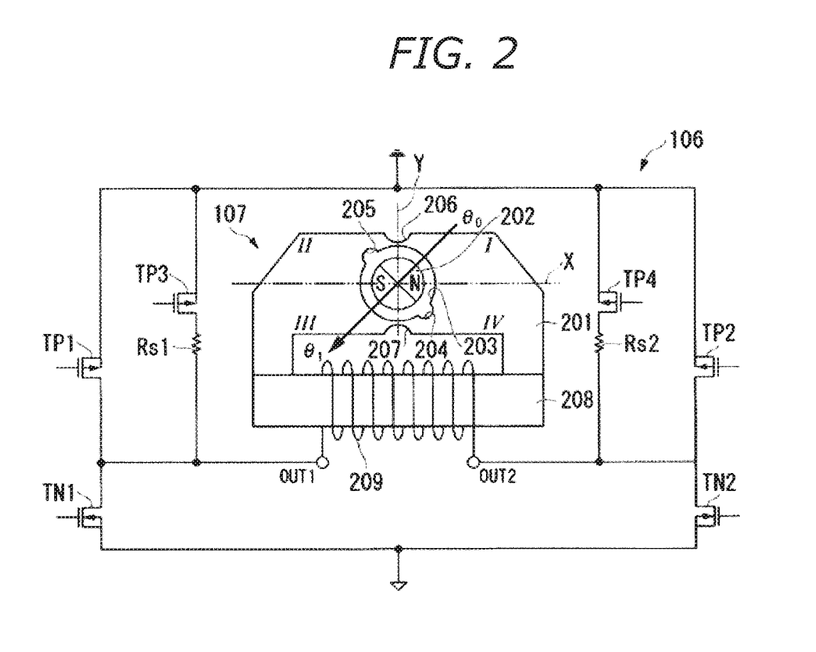
FIG. 2 is a diagram showing an example of a motor drive circuit and a stepping motor according to the embodiment.

FIG. 2 is a diagram showing an example of the motor drive circuit and the stepping motor according to the embodiment. As shown in FIG. 2, the motor drive circuit 106 includes a transistor TP1, a transistor TP2, a transistor TP3, a transistor TP4, a transistor TN1, a transistor TN2, a detection resistor Rs1, a detection resistor Rs2, a first terminal OUT1, and a second terminal OUT2.

The transistors TP1 to TP4 are P-channel metal-oxide-semiconductor field-effect transistors (MOSFETs), and each of the transistors TP1 to TP4 is turned on when a high-level gate signal is received and turned off when a low-level gate signal is received. The transistors TN1 and TN2 are N-channel MOSFETs, and each of the transistors TN1 and TN2 is turned off when a high-level gate signal is received and turned on when a low-level gate signal is received. A high level potential is a potential equal to VDD that is an electric power supply voltage of the motor drive circuit 106. A low level potential is a potential equal to 0 V or VSS that is a reference voltage.

Drains of the transistors TP1 to TP4 are electrically connected one another and supplied with the VDD serving as the electric power supply voltage of the motor drive circuit 106. A source of the transistor TP3 is electrically connected to one end of the detection resistor Rs1. Further, a source of the transistor TP1, a source of the transistor TN1, and the other end of the detection resistor Rs1 are electrically connected to the first terminal OUT1. A source of the transistor TP4 is electrically connected to one end of the detection resistor Rs2. Further, the source of the transistor TP4, a source of the transistor TN2, and the other end of the detection resistor Rs2 are electrically connected to the second terminal OUT2. The sources of the transistors TN1 and TN2 are electrically connected to each other and supplied with 0 V or the VSS that is the reference voltage. The first terminal OUT1 and the second terminal OUT2 are connected to an input terminal of a comparator provided in the rotation detection circuit 113. Further, a reference voltage Vcomp to be described below is input to a reference input terminal of the comparator.

As shown in FIG. 2, the stepping motor 107 includes a stator 201, the rotor 202, a rotor housing through hole 203, an inner notch 204, an inner notch 205, an outer notch 206, an outer notch 207, a magnetic core 208, and a coil 209.

The stator 201 is a member formed of a magnetic material. The rotor 202 is formed in a cylindrical shape and is inserted in a rotatable state in the rotor housing through hole 203 formed in the stator 201. Since being magnetized, the rotor 202 has an N pole and an S pole. The rotor 202 is rotated in the normal rotation direction to rotate the pointer 111 clockwise via a gear train, and is rotated in the reverse rotation direction to rotate the pointer 111 counterclockwise via the gear train.

The inner notches 204 and 205 are cutouts formed in a wall surface of the rotor housing through hole 203, and determine a stop position of the rotor 202 with respect to the stator 201. That is, for example, when the coil 209 is not excited, the rotor 202 stops at a position where a magnetic pole axis is orthogonal to a line segment that connects the inner notch 204 and the inner notch 205 as shown in FIG. 2.

The outer notches 206 and 207 are cutouts formed at positions sandwiching the rotor housing through hole 203 in an outer edge of the stator 201, and form a supersaturated portion with the rotor housing through hole 203. Here, the supersaturated portion is a portion that is not magnetically saturated by a magnetic flux of the rotor 202, and is magnetically saturated to increase a magnetic resistance when the coil 209 is excited.

The magnetic core 208 is a rod-shaped member formed of a magnetic material, and is bonded to both ends of the stator 201. The coil 209 is wound around the magnetic core 208, and has one end connected to the first terminal OUT1 and the other end connected to the second terminal OUT2.

Referring back to FIG. 1, the timepiece case 108 is a housing that houses the oscillation circuit 101, the frequency divider circuit 102, the control circuit 103, and the main drive pulse generation circuit 104, the correction drive pulse generation circuit 105, the motor drive circuit 106, the stepping motor 107, the analog display unit 109, the movement 110, the pointer 111, the calendar display unit 112, the rotation detection circuit 113, the determination circuit 114, and the detection control circuit 115. Further, the timepiece case 108 houses, for example, a voltmeter that measures a voltage of a battery which supplies electric power necessary for causing the drive current to flow to the coil 209, an integrated circuit (IC) that measures an absolute value of intensity of an external magnetic field of the timepiece 1, and a thermometer that measures a temperature around the timepiece 1 based on a resistance value of the coil 209.

The analog display unit 109 is a dial on which a scale is engraved. The movement 110 is a mechanical mechanism for driving each unit of the timepiece 1. The pointer 111 includes an hour hand, a minute hand, a second hand, and other hands. The calendar display unit 112 is driven by the stepping motor 107 and displays a date.

The rotation detection circuit 113 executes first rotation detection processing or second rotation detection processing, thereby detecting a rotation state of the rotor 202. The first rotation detection processing is processing of detecting the rotation of the rotor 202 based on a first induced voltage output to the second terminal OUT2, and is also referred to as one-way detection. On the other hand, the second rotation detection processing is processing of detecting the rotation of the rotor 202 based on the first induced voltage output to the first terminal OUT1 and the first induced voltage output to the second terminal OUT2, and is also referred to as two-way detection.

Here, the first induced voltage is an induced voltage that causes a first induced current to flow in the same direction as that of the drive current which flows from the first terminal OUT1 to the second terminal OUT2 of the coil 209 to rotate the rotor 202 in the normal rotation direction. The second induced voltage is an induced voltage that causes a second induced current to flow in a direction opposite to that of the drive current. Further, the rotation detection circuit 113 is appropriately switched between a case where the first induced voltage or the second induced voltage output to the first terminal OUT1 is detected and a case where the first induced voltage or the second induced voltage output to the second terminal OUT2 is detected.

Next, a relationship among behavior of the rotor 202, a braking force applied to the rotor 202, and voltages output to the first terminal OUT1 and the second terminal OUT2 when the rotor 202 is rotated in the normal rotation direction by one step in a state where the first rotation detection processing is executed by the rotation detection circuit 113 will be described with reference to FIGS. 3, 4A and 4B.

Figure 3:
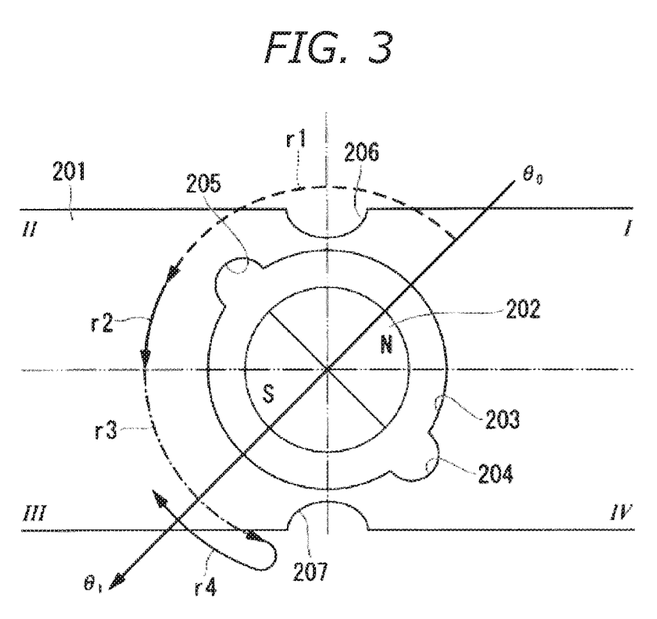
FIG. 3 is a diagram showing an example of behavior of a rotor when a pointer is rotated clockwise by one second according to the embodiment.

FIG. 3 is a diagram showing an example of the behavior of the rotor when the pointer is rotated clockwise by one second according to the embodiment. FIG. 4A shows an example of the voltage output to the second terminal of the coil, and FIG. 4B shows an example of the voltage output to the first terminal of the coil, when the timepiece executes the first rotation detection processing according to the embodiment. In the following description, a I quadrant, a II quadrant, a III quadrant, and a IV quadrant that are separated by an X direction and a Y direction shown in FIG. 3 are used. A horizontal magnetic pole is located at a boundary between the I quadrant and the IV quadrant and a boundary between the II quadrant and the III quadrant. In addition, a direction of $\theta_0$ and a direction of $\theta_1$ shown in FIG. 3 are directions where a magnetic potential is the minimum and the behavior of the rotor is stationary.

Figure 4A:
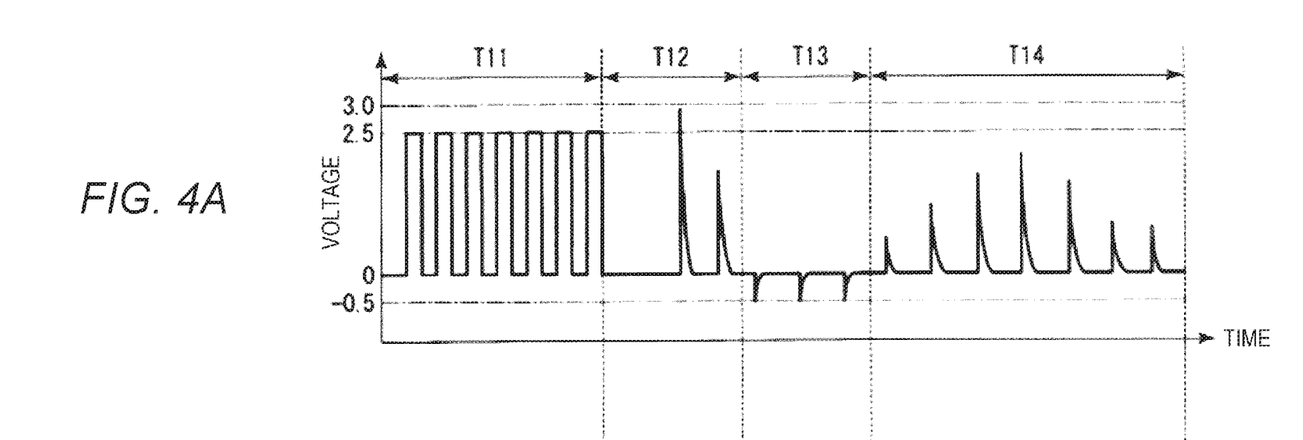
FIGS. 4A and 4B are diagrams respectively showing an example of a voltage output to a second terminal of a coil and an example of a voltage output to a first terminal of the coil when the timepiece executes first rotation detection processing according to the embodiment.
Figure 4B:
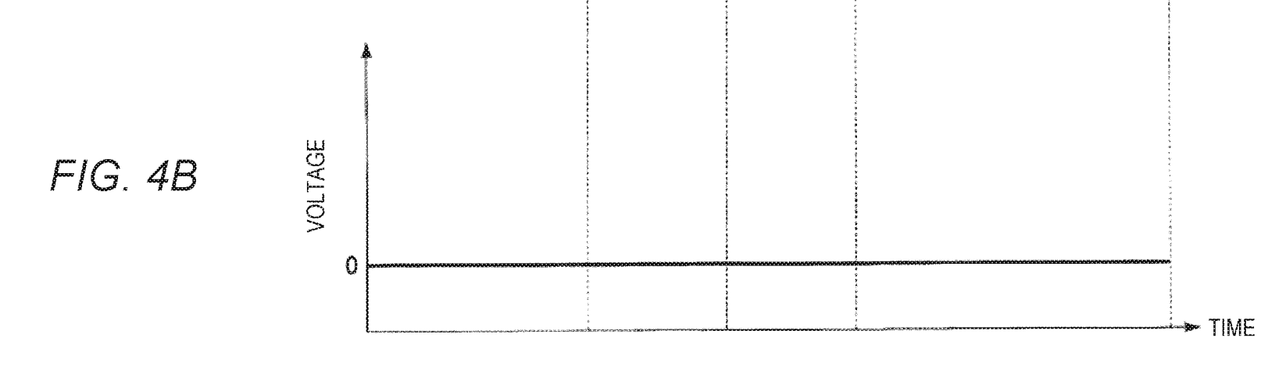

During a period T11 shown in FIGS. 4A and 4B, as indicated by a trajectory r1 of FIG. 3, the rotor 202 is rotated in the normal rotation direction from a state where the N pole faces the direction of $\theta_0$ until the N pole passes a direction where the magnetic potential formed by the inner notch 205 is the maximum. The rotation is implemented by the drive pulse output to the second terminal OUT2 during the period T11.

The drive pulse is output by turning on the transistor TP1, turning off the transistors TP3 and TP4, turning off the transistor TN1, and executing switching control of repeatedly turning on and off the transistors TP2 and TN2. As shown in FIG. 4A, when turned off, the drive pulse has a voltage of 0 V that is equal to the reference voltage VSS, and when turned on, the drive pulse has a voltage of 2.5 V that is equal to the electric power supply voltage VDD of the motor drive circuit 106.

During a period T12, a period T13, and a period T14 shown in FIGS. 4A and 4B, the motor drive circuit 106 performs chopper amplification on the induced voltage output to the first terminal OUT1 and the induced voltage output to the second terminal OUT2.

Specifically, in a state where the transistors TP3, TN1, and TN2 are turned off, the motor drive circuit 106 turns on the transistors TP1 and TP4 and executes switching control of repeatedly turning on and off the transistor TP2.

Accordingly, a state where a first closed circuit including the transistor TP4, the detection resistor Rs2, the coil 209, and the transistor TP1 is configured, and a state where a second closed circuit including the transistor TP2, the coil 209, and the transistor TP1 is configured are alternately switched. That is, a state where the first closed circuit having high impedance due to including the detection resistor Rs2 is configured and a state Where the second closed circuit having low impedance due to not including the detection resistor Rs2 is configured are alternately switched. The impedance is increased at the moment when the second closed circuit is switched to the first closed circuit, and the impedance is multiplied by the induced voltage in the first closed circuit. Therefore, the induced voltage output to the second terminal OUT2 is amplified.

Alternatively, in a state where the transistors TP4, TN1, and TN2 are turned off, the motor drive circuit 106 turns on the transistors TP2 and TP3 and executes switching control of repeatedly turning on and off the transistor TP1. In this case, a state where a closed circuit having high impedance is configured and a state where a closed circuit having low impedance is configured are alternately switched, thereby amplifying the induced voltage output to the first terminal OUT1.

During the period T12 shown in FIGS. 4A and 4B, as indicated by a trajectory r2 in FIG. 3, the rotor 202 is rotated in the normal rotation direction from a state where the N pole faces an angle direction beyond a point where the magnetic potential formed by the inner notch 205 is the maximum to a state where the N pole is located at the boundary between the II quadrant and the III quadrant. As shown in FIG. 4A, during the period T12, since a relatively large first induced voltage of about 3.0 V at the maximum is output to the second terminal OUT2, a braking force that prevents the rotor 202 from being rotated in the normal rotation direction is reduced. The first induced voltage is higher than 2.5 V, which is a potential of the VDD, by about 0.5 V because of a parasitic diode of the transistor TP4.

During the period T13 shown in FIG. 4A, as indicated by a trajectory r3 in FIG. 3, the rotor 202 is rotated from the state where the N pole is located at the boundary between the II quadrant and the III quadrant, through a state where the N pole faces the direction of $\theta_1$, until a rotational speed in the normal rotation direction is zero. In this case, the rotational speed of the rotor 202 in the normal rotation direction is zero in front of the supersaturated portion formed by the outer notch 207. As shown in FIG. 4A, during the period T13, since a relatively small second induced voltage of about −0.5 V is output to the second terminal OUT2, the braking force that prevents the rotor 202 from being rotated in the normal rotation direction is increased. The second induced voltage is lower than 0 V, which is an example of a potential of the VSS, by about 0.5 V because of the parasitic diode of the transistor TN.

During the period T14 shown in FIG. 4A, as indicated by a trajectory r4 in FIG. 3, the rotor 202 is rotated in the reverse rotation direction from the state where the rotational speed in the normal rotation direction is zero. As shown in FIG. 4A, during the period T14, since a relatively large first induced voltage of about 2.5 V is output to the second terminal OUT2, a braking force that prevents the rotor 202 from being rotated in the reverse rotation direction is reduced.

Further, when the first induced voltage output to the second terminal OUT2 during the period T12 is higher than a predetermined reference voltage, or when the first induced voltage output to the second terminal OUT2 during the period T12 and the first induced voltage output to the second terminal OUT2 during the period T14 are higher than the predetermined reference voltage, the rotation detection circuit 113 determines that the rotor 202 has been normally rotated by one step.

As described above, the first rotation detection processing is processing of detecting the rotation of the rotor 202 based on the first induced voltage output to the second terminal OUT2. For this reason, when the first rotation detection processing is executed, the voltage output to the first terminal OUT1 is always approximately 0 V as shown in FIG. 4B.

Next, a relationship among behavior of the rotor 202, a braking force applied to the rotor 202, and voltages output to the first terminal OUT1, and the second terminal OUT2 when the rotor 202 is rotated in the normal rotation direction by one step in a state where the second rotation detection processing is executed by the rotation detection circuit 113 will be described with reference to FIGS. 3, 5A and 5B.

Figure 5A:
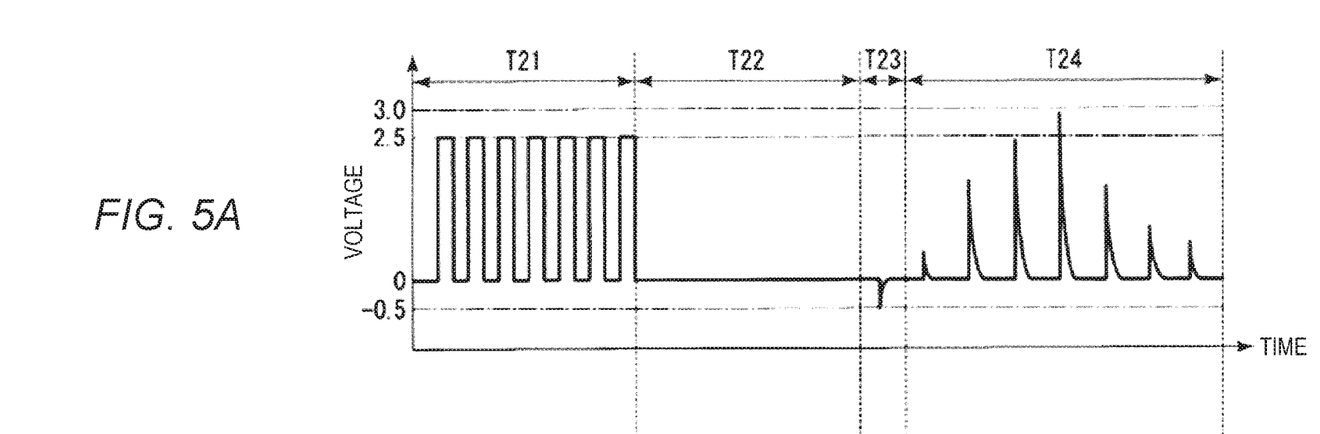
FIGS. 5A and 5B are diagrams respectively showing an example of a voltage output to the second terminal of the coil and an example of a voltage output to the first terminal of the coil when the timepiece executes second rotation detection processing according to the embodiment.
Figure 5B:
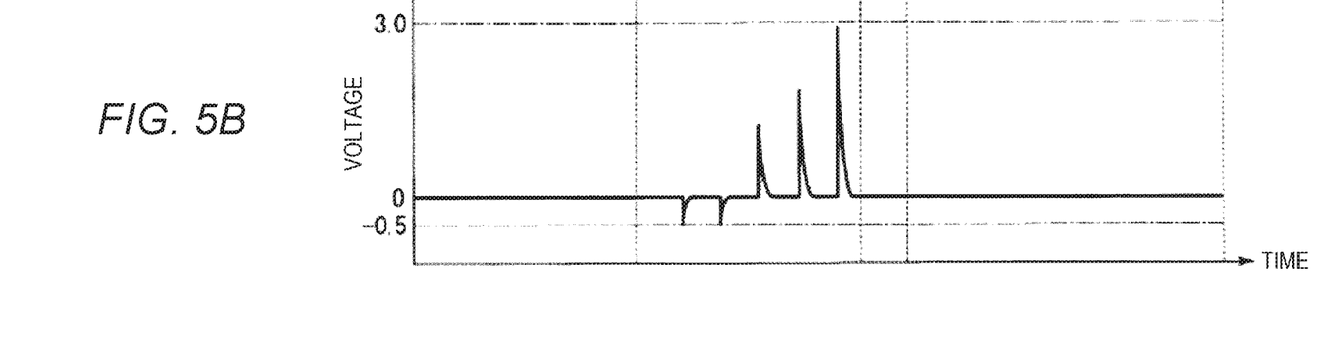

FIG. 5A shows an example of the voltage output to the second terminal of the coil, and FIG. 5B shows an example of the voltage output to the first terminal of the coil, when the timepiece executes the second rotation detection processing according to the embodiment.

During a period T21 shown in FIGS. 5A and 5B, as indicated by the trajectory r1 in FIG. 3, the rotor 202 is rotated in the normal rotation direction from the state where the N pole faces the direction of $\theta_0$ until the N pole passes the point where the magnetic potential formed by the inner notch 205 is the maximum. The rotation is implemented by the drive pulse output to the second terminal OUT2 during the period T21.

The drive pulse is output by turning on the transistor TP1, turning off the transistors TP3 and TP4, turning off the transistor TN1, and executing the switching control of repeatedly turning on and off the transistors TP2 and TN2. As shown in FIG. 5A, when turned off, the drive pulse has a voltage of 0 V that is equal to the reference voltage VSS, and when turned on, the drive pulse has a voltage of 2.5 V that is equal to the electric power supply voltage VDD of the motor drive circuit 106.

During a period T22, a period T23, and a period T24 shown in FIGS. 5A and 5B, the motor drive circuit 106 performs the chopper amplification on the induced voltage output to the first terminal OUT1 and the induced voltage Output to the second terminal OUT2 by the similar method as that executed during the period T12, the period T13, and the period T14 shown in FIGS. 4A and 4B.

During the period T22 shown in FIGS. 5A and 5B, as indicated by the trajectory r2 in FIG. 3, the rotor 202 is rotated in the normal rotation direction in the HI quadrant, beyond the state where the N pole is located at the boundary between the II quadrant and the III quadrant, from the state where the N pole faces the angle direction beyond the point where the magnetic potential formed by the inner notch 205 is the maximum. As shown in FIG. 5B, during the period T22, a voltage of −0.5 V is output to the first terminal OUT1 in the state where the N pole is located at the boundary between the II quadrant and the III quadrant, and a relatively large first induced voltage of about 3.0 V at the maximum is output to the first terminal OUT1 in the state where the N pole passes the boundary and rotates in the III quadrant. Therefore, the braking force that prevents the rotor 202 from being rotated in the normal rotation direction is reduced. The first induced voltage is higher than 2.5 V, which is the potential of the VDD, by about 0.5 V because of a parasitic diode of the transistor TP3.

However, as shown in FIG. 5B, the first induced voltage output to the first terminal OUT1 during the period T22 shown in FIGS. 5A and 5B is the maximum when the N pole of the rotor 202 is located just before the boundary between the II quadrant and the III quadrant. On the other hand, as shown in FIG. 4A, the first induced voltage output during the period T12 shown in FIGS. 4A and 4B is the maximum when the N pole of the rotor 202 reaches a middle of the trajectory r3 shown in FIG. 3. Therefore, when the second rotation detection processing is executed, the N pole of the rotor 202 enters the III quadrant at a rotational speed faster than that when the first rotation detection processing is executed.

The period T23 shown in FIGS. 5A and 5B is a stage where a polarity is switched to a reversed polarity because the output of the induced voltage is detected during the period T22. As indicated by the trajectory r3 in FIG. 3, the rotor 202 is rotated from the state where the N pole is located at the boundary between the II quadrant and the III quadrant, through the state where the N pole faces the direction of $\theta_1$, until the rotational speed in the normal rotation direction is zero. In this case, the rotational speed of the rotor 202 in the normal rotation direction is zero in front of the supersaturated portion formed by the outer notch 207. As shown in FIG. 5A, during the period T23, since a relatively small second induced voltage of about −0.5 V is output to the second terminal OUT2, the braking force that prevents the rotor 202 from being rotated in the normal rotation direction is increased. The second induced voltage is lower than 0 V, which is an example of the potential of the VSS, by about 0.5 V because of the parasitic diode of the transistor TP4.

However, as described above, the N pole of the rotor 202 enters the III quadrant at the rotational speed faster than that when the first rotation detection processing is executed. For this reason, a length of the period T23 during which the second induced voltage of about −0.5 V is output to the second terminal OUT2 is shorter than a length of the period T13 during which the second induced voltage of about −0.5 V is output to the first terminal OUT1. Therefore, when the second rotation detection processing is executed, the braking force that brakes the rotor 202 in the III quadrant is smaller than that when the first rotation detection processing is executed.

During the period T24 shown in FIGS. 5A and 5B, as indicated by the trajectory r4 in FIG. 3, the rotor 202 rotates in the reverse rotation direction from the state where the rotational speed in the normal rotation direction is zero. As shown in FIG. 5A, during the period 124, since a relatively large first induced voltage of about 3.0 V is output to the second terminal OUT2, the braking force that prevents the rotor 202 from being rotated in the reverse rotation direction is reduced.

The rotation detection circuit 113 determines that the rotor 202 is normally rotated by one step when the first induced voltage output to the first terminal OUT1 during the period T22 and the first induced voltage output to the second terminal OUT2 during the period T24 are higher than the predetermined reference voltage.

As described above, the braking force that brakes the rotation in the normal rotation direction of the rotor 202 in which the N pole passes through the III quadrant is smaller when the second rotation detection processing is executed than that when the first rotation detection processing is executed. Therefore, when it is preferable that the braking force that brakes the rotor 202 rotated in the normal rotation direction is large, the first rotation detection processing is preferably executed. Similarly, when it is preferable that the braking force that brakes the rotor 202 rotated in the normal rotation direction is small, the second rotation detection processing is preferably executed. Further, the maximum value of the induced voltage of about 3.0 V shown in FIGS. 4A, 4B, 5A and 5B is the maximum value when the potential of the VDD serving as the electric power supply voltage is 2.5 V, and is changed by the potential of the VDD and the parasitic diode.

The rotation detection circuit 113 outputs, to the determination circuit 114, data indicating time starting from a time point when the output of the main drive pulse is ended until an earlier time point between a time point when the first induced voltage is initially output and a time point when the second induced voltage is initially output. The data is output both when the first rotation detection processing is executed and when the second rotation detection processing is executed.

The determination circuit 114 executes determination processing of determining whether the braking force is preferably large or small. The braking force brakes the rotor 202 rotated in the normal rotation direction to rotate the pointer clockwise. That is, the determination circuit 114 determines magnitude required for the braking force of the rotor 202.

For example, the determination circuit 114 acquires data indicating a voltage measured by the voltmeter housed in the timepiece case 108. Further, when the voltage of the battery, which supplies the electric power necessary for causing the drive current to flow to the coil 209, is lower than a voltage threshold, the determination circuit 114 determines that the braking force that brakes the rotation of the rotor 202 in the normal rotation direction is preferably small, and when the voltage of the battery is equal to or higher than the voltage threshold, the determination circuit 114 determines that the braking force is preferably large.

Alternatively, the determination circuit 114 acquires data indicating the absolute value of the intensity of the external magnetic field measured by the IC housed in the timepiece case 108. Further, when the absolute value of the intensity of the external magnetic field applied to the rotor 202 is equal to or larger than a magnetic field threshold, the determination circuit 114 determines that the braking force that brakes the rotation of the rotor 202 in the normal rotation direction is preferably large.

Alternatively, the determination circuit 114 acquires data indicating the temperature measured by the thermometer housed in the timepiece case 108. Further, when the temperature calculated based on the resistance value of the coil 209 is lower than a temperature threshold, the determination circuit 114 determines that the braking force that brakes the rotation of the rotor 202 in the normal rotation direction is preferably small.

Alternatively, the determination circuit 114 acquires the data indicating the time starting from the time point when the output of the main drive pulse from the rotation detection circuit 113 is ended until the earlier time point between the time point when the first induced voltage is initially output and the time point when the second induced voltage is initially output. Further, when the first induced voltage or the second induced voltage is output within a predetermined time since the time point when the output of the main drive pulse for causing the drive current to flow to the coil 209 is ended, the determination circuit 114 determines that the braking force that brakes the rotation of the rotor 202 in the normal rotation direction is preferably large. On the other hand, when the first induced voltage or the second induced voltage is output after the predetermined time, the determination circuit 114 determines that the braking force that brakes the rotation of the rotor 202 in the normal rotation direction is preferably small. This is because, the earlier the stage where the first induced voltage or the second induced voltage is output, the faster the rotational speed of the rotor 202 in the normal rotation direction is, and the easier it is for the rotor 202 to be rotated in the normal rotation direction.

Alternatively, the determination circuit 114 acquires data indicating that the correction drive pulse is output from the correction drive pulse generation circuit 105. Further, the determination circuit 114 determines that the braking force that brakes the rotation of the rotor 202 in the normal rotation direction is preferably small.

Alternatively, the determination circuit 114 executes, a plurality of times, the determination processing of determining whether the braking force that brakes the rotor 202 rotated in the normal rotation direction is preferably large or small. The determination circuit 114 compares the number of times that it is determined that the braking force is preferably large with the number of times that it is determined that the braking force is preferably small. When there are more times that it is determined that the braking force is preferably large, the determination circuit 114 determines that the braking force is preferably large. Further, the determination circuit 114 compares the number of times that it is determined that the braking force is preferably large with the number of times that it is determined that the braking force is preferably small. When there are more times that it is determined that the braking force is preferably small, the determination circuit 114 determines that the braking force is preferably small.

Based on the induced voltage induced in the coil 209 after the main drive pulse for causing the drive current to flow to the coil 209 is output, the above-described rotation detection circuit 113 may specify a reference position where a load applied to the rotor 202 when the pointer 111 is rotated clockwise is compared with and differs from loads from other positions by a predetermined threshold or more. For example, the reference position is a position where the pointer 111 points to a 12 o'clock scale engraved on the analog display unit 109. For example, when the pointer 111 is at the reference position, teeth having shapes different from other teeth of gears that constitute the above-described gear train mesh with teeth of another gear, and energy required for rotating these gears is often temporarily increased. The method for specifying the reference position by the rotation detection circuit 113 is not particularly limited. Further, when the rotation detection circuit 113 cannot specify the reference position, the determination circuit 114 determines that the braking force is preferably small.

The detection control circuit 115 determines whether the currently executed rotation detection processing is the first rotation detection processing. When it is determined that the braking force that brakes the rotor 202 is preferably large, the detection control circuit 115 selects the first rotation detection processing and causes the rotation detection circuit 113 to execute the first rotation detection processing. When it is determined that the braking force that brakes the rotor 202 is preferably small, the detection control circuit 115 selects the second rotation detection processing and causes the rotation detection circuit 113 to execute the second rotation detection processing.

Alternatively, when the correction drive pulse is output, which has electric power consumption larger than that of the main drive pulse for causing the drive current to flow to the coil 209, the determination circuit 114 re-executes the determination processing of determining whether the braking force that brakes the rotor 202 rotated in the normal rotation direction is preferably large or small. In this case, when it is determined that the braking force is preferably large in the re-executed determination processing, the detection control circuit 115 causes execution of the first rotation detection processing; and when it is determined that the braking force is preferably small in the re-executed determination processing, the detection control circuit 115 causes execution of the second rotation detection processing.

Figure 6:
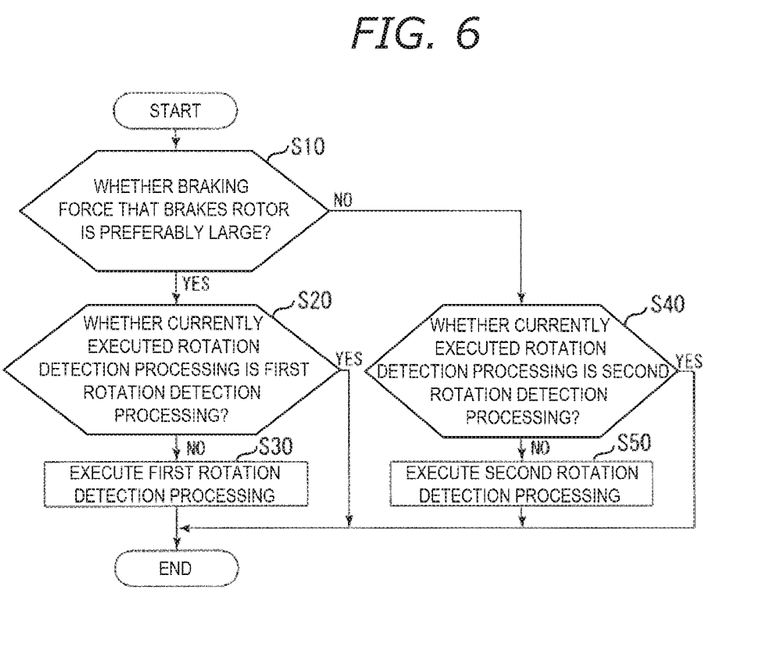
FIG. 6 is a flowchart showing an example of processing executed by the timepiece according to the embodiment.

Next, an example of an operation of the timepiece according to the embodiment will be described with reference to FIG. 6. FIG. 6 is a flowchart showing an example of processing to be executed by the timepiece according to the embodiment.

In step S10, the determination circuit 114 determines whether the braking force that brakes the rotor 202 is preferably large. That is, the determination circuit 114 determines the magnitude required for the braking force of the rotor 202. When the determination circuit 114 determines that the braking force that brakes the rotor 202 is preferably large (step S10: Yes), the processing proceeds to step S20. On the other hand, when the determination circuit 114 determines that the braking force that brakes the rotor 202 is not preferably large, that is, the braking force is preferably small (step S10: No), the processing proceeds to step S40.

In step S20, the detection control circuit 115 determines whether the currently executed rotation detection processing is the first rotation detection processing. When the detection control circuit 115 determines that the currently executed rotation detection processing is the first rotation detection processing (step S20: Yes), the processing ends. On the other hand, when the detection control circuit 115 determines that the currently executed rotation detection processing is not the first rotation detection processing (step S20: No), the processing proceeds to step S30.

In step S30, the detection control circuit 115 causes the rotation detection circuit 113 to execute the first rotation detection processing.

In step S40, the detection control circuit 115 determines whether the currently executed rotation detection processing is the second rotation detection processing. When the detection control circuit 115 determines that the currently executed rotation detection processing is the second rotation detection processing (step S40: Yes), the processing ends. On the other hand, when the detection control circuit 115 determines that the currently executed rotation detection processing is not the second rotation detection processing (step S40: No), the processing proceeds to step S50.

In step S50, the detection control circuit 115 causes the rotation detection circuit 113 to execute the second rotation detection processing.

The timepiece 1 and the timepiece control method according to the embodiment have been described above. When the braking force applied to the rotor 202 is preferably large, the timepiece 1 causes the rotation detection circuit 113 to execute the first rotation detection processing. On the other hand, when the braking force applied to the rotor 202 is preferably small, the timepiece 1 causes the rotation detection circuit 113 to execute the second rotation detection processing. Accordingly, the timepiece 1 can adjust the magnitude of the braking force applied to the rotor 202 in accordance with a condition where the timepiece 1 itself is placed.

When the voltage of the battery, which supplies the electric power necessary for causing the drive current to flow to the coil 209, is lower than the voltage threshold, the timepiece 1 determines that the braking force applied to the rotor 202 is preferably small and executes the second rotation detection processing. Accordingly, even when the voltage of the battery is low and a drive force produced by the drive current is weak, the timepiece 1 can reduce the braking force applied to the rotor 202 and avoid a situation where the rotor 202 is not rotated sufficiently. On the other hand, when the voltage of the battery is equal to or higher than the voltage threshold, the timepiece 1 determines that the braking force is preferably large and executes the first rotation detection processing. Accordingly, even when the voltage of the battery is high and the drive force produced by the drive current is strong, the timepiece 1 can increase the braking force applied to the rotor 202 and avoid a situation where the rotor 202 is rotated excessively.

When the absolute value of the intensity of the external magnetic field applied to the rotor 202 is equal to or larger than the magnetic field threshold, the timepiece 1 determines that the braking force applied to the rotor 202 is preferably large and executes the first rotation detection processing. Accordingly, even when the rotor 202 is likely to be rotated excessively in the normal rotation direction due to an influence of the external magnetic field, the timepiece 1 can increase the braking force applied to the rotor 202 and avoid the situation where the rotor 202 is rotated excessively.

When the temperature calculated based on the resistance value of the coil 209 is lower than the temperature threshold, the timepiece 1 determines that the braking force applied to the rotor 202 is preferably small and executes the second rotation detection processing. Accordingly, even when an lubricating oil applied to the gear train that transmits the rotation of the rotor 202 to the pointer 111 is solidified due to the decrease in an ambient temperature and it is difficult for the rotor 202 to be rotated in the normal rotation direction, the timepiece 1 can reduce the braking force applied to the rotor 202 and avoid the situation where the rotor 202 is not rotated sufficiently.

When the first induced voltage or the second induced voltage is output within the predetermined time since the time point when the output of the main drive pulse is ended, the timepiece 1 determines that the braking force applied to the rotor 202 is preferably large and executes the first rotation detection processing. Accordingly, even when it is easy for the rotor 202 to be rotated in the normal rotation direction, the timepiece 1 can increase the braking force applied to the rotor 202 and avoid the situation where the rotor 202 is rotated excessively. On the other hand, when the first induced voltage or the second induced voltage is output after the predetermined time since the time point when the output of the main drive pulse is ended, the timepiece 1 determines that the braking force applied to the rotor 202 is preferably small and executes the second rotation detection processing. Accordingly, even when it is difficult for the rotor 202 to be rotated in the normal rotation direction, the timepiece 1 can reduce the braking force applied to the rotor 202 and avoid the situation where the rotor 202 is not rotated sufficiently.

When the correction drive pulse is output, the timepiece 1 determines that the braking force applied to the rotor 202 is preferably small and executes the second rotation detection processing. Accordingly, the timepiece 1 can normally rotate the rotor 202 in the normal rotation direction while avoiding an increase in the electric power consumption caused by outputting the correction drive pulse. Such an operation is particularly effective for a case where the braking force that brakes the rotor 202 rotated in the normal rotation direction is too large, and at least one of the first induced voltage and the second induced voltage cannot be detected sufficiently.

When the correction drive pulse is output, which has the electric power consumption larger than that of the main drive pulse for causing the drive current to flow to the coil 209, the timepiece 1 re-executes the determination processing. Further, when it is determined that the braking force is preferably large in the re-executed determination processing, the timepiece 1 executes the first rotation detection processing; and when it is determined that the braking force is preferably small in the re-executed determination processing, the timepiece 1 executes the second rotation detection processing. Accordingly, even when various conditions necessary for rotating the rotor 202 in the normal rotation direction by 180 degrees were changed, the timepiece 1 can normally rotate the rotor 202 in the normal rotation direction without increasing or decreasing the energy of the main drive pulse. Such an operation is effective, for example, for a case where at least one of the first induced voltage and the second induced voltage, which is induced by free vibration of the rotor 202 around the direction of $\theta_0$ or the direction of $\theta_1$ shown in FIGS. 2 and 3, cannot be sufficiently detected when the above-described braking force is too small and thus the rotor 202 is rotated in the normal rotation direction excessively.

The timepiece 1 executes, a plurality of times, the determination processing of determining whether the braking force that brakes the rotor 202 rotated in the normal rotation direction is preferably large or small. Further, the timepiece 1 compares the number of times that it is determined that the braking force is preferably large with the number of times that it is determined that the braking force is preferably small. When there are more times that it is determined that the braking force is preferably large, the timepiece 1 determines that the braking force is preferably large. Further, the timepiece 1 compares the number of times that it is determined that the braking force is preferably large with the number of times that it is determined that the braking force is preferably small. When there are more times that it is determined that the braking force is preferably small, the timepiece 1 determines that the braking force is preferably small. By the processing, even when the various conditions necessary for rotating the rotor 202 in the normal rotation direction by 180 degrees were changed while the pointer 111 makes one revolution on the analog display unit 109, the timepiece 1 can more accurately determine which one of the first rotation detection processing and the second rotation detection processing is appropriate.

The various conditions necessary for rotating the rotor 202 in the normal rotation direction by 180 degrees vary depending on, for example, a change in a posture of the timepiece 1, and a change in viscosity of the lubricating oil applied to the gears that constitute the gear train.

When the rotation detection circuit 113 cannot specify the reference position, the timepiece 1 determines that the braking force is preferably small. Accordingly, the timepiece 1 can specify the reference position without changing the energy of the main drive pulse even when the energy of the main drive pulse is insufficient, the rotor 202 is not rotated at a sufficiently high rotational speed, and at least one of the first induced voltage and the second induced voltage cannot be sufficiently detected.

All or a part of functions of the timepiece 1 described above may be recorded as a program on a computer-readable recording medium, and the program may be executed by a computer system. The computer system includes hardware such as an OS and peripheral devices. The computer-readable recording medium includes, for example, a portable medium such as a flexible disk, a magneto-optical disk, a ROM (Read Only Memory), and a CD-ROM, a storage device such as a hard disk built in the computer system, and a volatile memory (Random Access Memory: RAM) in a server or the like on a network such as the Internet. The volatile memory is an example of a recording medium that holds a program for a certain period of time.

The program described above may be transmitted to another computer system via a transmission medium, for example, a network such as the Internet, or a communication line such as a telephone line.

In addition, the program may be a program that implements all or a part of the functions described above. The program that implements a part of the functions described above may be a program that can implement the functions described above in combination with a program recorded in advance in the computer system, that is, a so-called differential program.

While an embodiment of the invention has been described by using the embodiment above, the invention is not limited to such an embodiment, and various modifications and replacements may be made without departing from the spirit of the invention.

What is claimed is:

1. A timepiece comprising:
   a determination circuit configured to execute a determination process for determining whether a braking force, which is applied to brake a rotor while the rotor is rotating in a normal rotation direction to rotate a watch pointer clockwise, is preferably large or small; and
   a detection control circuit configured to:
      in response to determination by the determination circuit that the braking force is preferably large, execute a first rotation detection process in which rotation of the rotor is detected based on a first induced voltage output to a second terminal, wherein the second terminal is connected via one end of a coil energized to generate a magnetic flux to rotate the rotor in the normal rotation direction, and
      in response to determination by the determination circuit that the braking force is preferably small, execute a second rotation detection process in which rotation of the rotor is detected based on the first induced voltage output to a first terminal and the first induced voltage output to the second terminal, wherein the first terminal is connected via the other end of the coil.

2. The timepiece according to claim 1, wherein the determination circuit is configured to determine that the braking force is preferably small when a voltage of a battery that supplies electric power necessary for drive current to flow through the coil is lower than a voltage threshold, and determine that the braking force is preferably large when the voltage of the battery is equal to or higher than the voltage threshold.

3. The timepiece according to claim 1, wherein the determination circuit is configured to determine that the braking force is preferably large when an absolute value of intensity of an external magnetic field applied to the rotor is equal to or larger than a magnetic field threshold.

4. The timepiece according to claim 1, wherein the determination circuit is configured to determine that the braking force is preferably small when a temperature calculated based on a resistance value of the coil is lower than a temperature threshold.

5. The timepiece according to claim 1, wherein a second induced voltage is output that flows drive current in a direction opposite to a direction in which the first induced voltage flows drive current, and wherein
   the determination circuit is configured to determine that the braking force is preferably large when the first induced voltage or the second induced voltage is output within a predetermined time after an output of a main drive pulse to flow the drive current through the coil ends, and determine that the braking force is preferably small when the first induced voltage or the second induced voltage is output after the predetermined time elapsed.

6. The timepiece according to claim 1, wherein the determination circuit is configured to determine that the braking force is preferably small when a correction drive pulse is output which is larger in electric power consumption than a main drive pulse for flowing drive current through the coil.

7. The timepiece according to claim 1, wherein the determination circuit is configured to re-execute the determination process when a correction drive pulse is output which is larger in electric power consumption than a main drive pulse for flowing drive current through the coil, and the detection control circuit is configured to execute the first rotation detection process when it is determined, as a result of re-execution of the determination process, that the braking force is preferably large, and execute the second rotation detection process when it is determined, as a result of re-execution of the determination process, that the braking force is preferably small.

8. The timepiece according to claim 1, wherein the determination circuit is configured to:
execute the determination process at a plurality of times;
compare a number of times that it is determined that the braking force is preferably large with a number of times that it is determined that the braking force is preferably small; and
in response to determination that the number of times at which it is determined that the braking forces is preferably large exceeds the number of times at which it is determined that the braking force is preferably small, determine that the braking force is preferably large.

9. The timepiece according to claim 1, wherein the determination circuit is configured to:
execute the determination process at a plurality of times;
compare a number of times that it is determined that the braking force is preferably large with a number of times that it is determined that the braking force is preferably small; and
in response to determination that the number of times at which it is determined that the braking force is preferably small exceeds the number of times at which it is determined that the braking force is preferably large, determine that the braking force is preferably small.

10. The timepiece according to claim 1, further comprising a rotation detection circuit configured to identify a reference position at which a load applied to the rotor to rotate the watch pointer clockwise exceeds loads applied to the rotor at other positions by a predetermined threshold or more, wherein a load is determined based on a voltage induced in the coil after a main drive pulse for flowing drive current through the coil is output, wherein
the determination circuit is configured to determine that the braking force is preferably small when the rotation detection circuit is not able to identify the reference position.

11. A timepiece comprising:
a motor that includes a rotor energized to rotate a watch pointer;
a determination circuit configured to determine a magnitude of a braking force applied to brake the rotor, wherein the determination circuit is configured to determine whether the braking force is preferably large or small;
a detection control circuit configured to select, based on a determination result of the determination circuit, a first rotation detection process for detecting rotation of the rotor or a second rotation detection process which is different from the first rotation detection process and whose braking force is different from that of the first rotation detection process,
wherein the detection control circuit configured to:
in response to determination by the determination circuit that the braking force is preferably large, select the first rotation detection process; and
in response to determination by the determination circuit that the braking force is preferably small, select the second rotation detection process; and
a rotation detection circuit configured to detect rotation of the rotor in a rotation detection process selected by the detection control circuit.

* * * * *

UNITED STATES PATENT AND TRADEMARK OFFICE
CERTIFICATE OF CORRECTION

PATENT NO. : 11,334,030 B2
APPLICATION NO. : 16/737391
DATED : May 17, 2022
INVENTOR(S) : Kosuke Yamamoto It is certified that error appears in the above-identified patent and that said Letters Patent is hereby corrected as shown below:

In the Claims

In Column 17, Claim 8, Line 16, delete "forces" and replace with --force--.

Signed and Sealed this
Thirteenth Day of December, 2022

Katherine Kelly Vidal
*Director of the United States Patent and Trademark Office*